US008447108B2

(12) United States Patent
Park

(10) Patent No.: US 8,447,108 B2
(45) Date of Patent: May 21, 2013

(54) APPARATUS AND METHOD FOR EXTRACTING TARGET, AND RECORDING MEDIA STORING PROGRAM PERFORMING THE METHOD

(75) Inventor: Se Kyung Park, Seoul (KR)

(73) Assignee: LIG NEX1 Co., Ltd., Seoul (KR)

( * ) Notice: Subject to any disclaimer, the term of this patent is extended or adjusted under 35 U.S.C. 154(b) by 299 days.

(21) Appl. No.: 12/976,901

(22) Filed: Dec. 22, 2010

(65) Prior Publication Data

US 2012/0027296 A1 Feb. 2, 2012

(30) Foreign Application Priority Data

Jul. 29, 2010 (KR) .......................... 10-2010-0073362

(51) Int. Cl.
G06K 9/34 (2006.01)
G06K 9/46 (2006.01)

(52) U.S. Cl.
USPC ......................................... 382/171; 382/190

(58) Field of Classification Search
None
See application file for complete search history.

(56) References Cited

U.S. PATENT DOCUMENTS

| 3,803,394 | A | | 4/1974 | Fraser | |
|---|---|---|---|---|---|
| 5,878,163 | A | * | 3/1999 | Stephan et al. | 382/172 |
| 6,369,848 | B1 | * | 4/2002 | Ohkubo | 348/14.08 |
| 6,625,316 | B1 | * | 9/2003 | Maeda | 382/203 |
| 7,116,820 | B2 | * | 10/2006 | Luo et al. | 382/167 |
| 7,363,169 | B2 | * | 4/2008 | Dougherty et al. | 702/19 |
| 2002/0003545 | A1 | * | 1/2002 | Nakamura | 345/640 |
| 2006/0221188 | A1 | * | 10/2006 | Moon | 348/207.1 |
| 2010/0045800 | A1 | * | 2/2010 | Chebil et al. | 348/169 |
| 2010/0177194 | A1 | * | 7/2010 | Huang et al. | 348/157 |

FOREIGN PATENT DOCUMENTS

| JP | 2000-048211 A | 2/2000 |
|---|---|---|
| JP | 2003-006654 A | 1/2003 |

* cited by examiner

Primary Examiner — Wenpeng Chen
Assistant Examiner — Feng Niu

(57) ABSTRACT

Provided are an apparatus and a method for extracting a target related to an algorithm separating the target and a background by using statistical characteristics of the target and the background among target extracting methods required in a weight value center tracking method, and recording media storing a program performing the method. According to the present invention, it is possible to effectively separate the target region and the background region from each other and it is possible to improve reliability in target extracting performance.

13 Claims, 3 Drawing Sheets

(a)  (b)

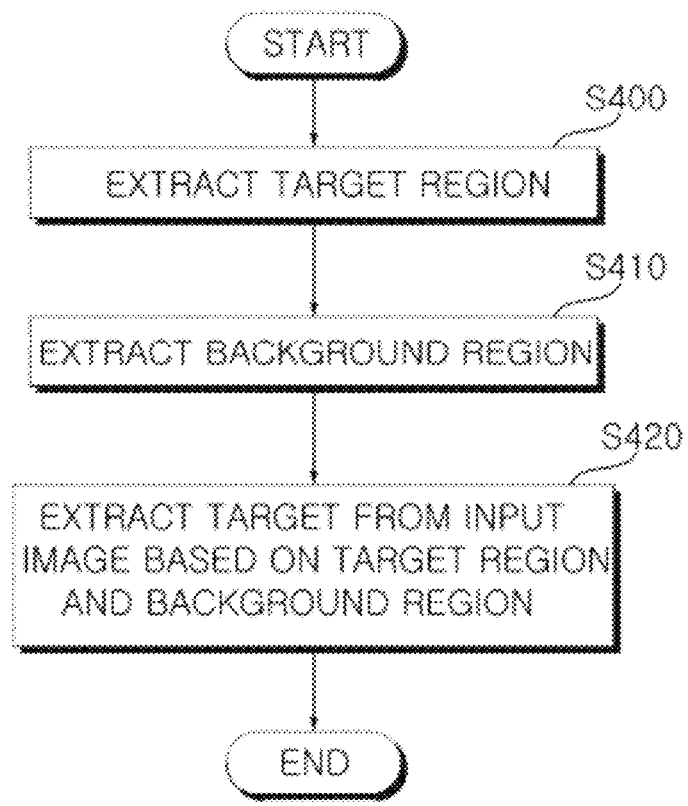

APPARATUS AND METHOD FOR EXTRACTING TARGET, AND RECORDING MEDIA STORING PROGRAM PERFORMING THE METHOD

BACKGROUND OF THE INVENTION

1. Field of the Invention

The present invention relates to an apparatus and a method for extracting a target, and recording media storing a program performing the method. More particularly, the present invention relates to an apparatus and a method for extracting a target related to an algorithm separating the target and a background by using statistical characteristics of the target and the background among target extracting methods required in a weight value center tracking method, and recording media storing a program performing the method.

2. Description of the Related Art

In the related art, a target was extracted based on statistical characteristics of a target region and a background region by using an inner region (target region) including the target and an outer region (background region) not including the target.

By the way, in the target extracting method, a part that exerts the largest influence on performance is how the background region is set without including the target. However, in the related art, since there was no criterion in respects to how to set the background region, reliable statistical information could not be obtained during actual implementation and tracking reliability was deteriorated. This is because the point that the setting method of the background region has a large influence on the performance of target tracking was ignored.

SUMMARY OF THE INVENTION

The present invention has been made in an effort to provide an apparatus and a method for extracting a target that adjust a distance up to a background and the size of the background on the basis of a target region extracted while consecutive images are inputted, and recording media storing a program performing the method.

Further, the present invention has been made in an effort to provide an apparatus and a method for extracting a target that increase the number of pixels of the target by using a weight value function, and recording media storing a program performing the method.

An exemplary embodiment of the present invention provides a method for extracting a target, the method including: extracting a target region from an input image; extracting a background region from the input image by considering the size of the target region; and extracting the target from the input image on the basis of the target region and the background region.

In the extracting of the background region, the background region may be extracted by adjusting the size of the background region to be in proportion to the size of the target region. In the extracting of the background region, the size of the background region may be calculated by multiplying the size of the target region by a predetermined first gain value and the background region may be extracted on the basis of the calculated size of the background region.

In the extracting of the background region, a distance from the target region may further be considered at the time of extracting the background region. In the extracting of the background region, the background region may be extracted by adjusting the size of the background region to be in inverse proportion to the distance from the target region. In the extracting of the background region, the distance from the target region may be calculated by using a value obtained by dividing a predetermined second gain value by the size of the target region and the background region may be extracted on the basis of the calculated distance from the target region.

The extracting of the target may include: generating a target histogram for the target region and generating a background histogram for the background region; generating a lookup table by using the target histogram and the background histogram; generating a likelihood map by using the lookup table; calculating thresholds for extracting the target from the likelihood map; and extracting the target from the input image by using the thresholds. In the generating of the histogram, the target histogram may be generated by considering a weight value depending on a distance from a center in the target region for each of pixels constituting the target region.

In the extracting of the background region, a region where the target region is surrounded by the background region may be extracted.

In the extracting of the target region, the target region may be extracted on the basis of an estimated position of the target from the input image in accordance with a predetermined tracking algorithm.

The target extracted in the extracting of the target may be used to track the target in an image inputted after the input image.

Another exemplary embodiment of the present invention provides an apparatus for extracting a target, the apparatus including: a target region extracting unit extracting a target region from an input image; a background region extracting unit extracting a background region from the input image by considering the size of the target region; and a target extracting unit extracting the target from the input image on the basis of the target region and the background region.

The background region extracting unit may extract the background region by adjusting the size of the background region to be in proportion to the size of the target region.

The background region extracting unit may include: a background region size calculating module calculating the size of the background region by multiplying the size of the target region by a predetermined first gain value; and a background region extracting module extracting the background region on the basis of the calculated size of the background region.

The background region extracting unit may further consider the distance from the target at the time of extracting the background region. The background region extracting unit may extract the background region by adjusting the size of the background region to be in inverse proportion to the distance from the target region.

The background region extracting unit may include: a distance calculating module calculating the distance from the target region by using a value obtained by dividing a predetermined second gain value by the size of the target region; and a background region extracting module extracting the background region on the basis of the calculated distance from the target region.

The target extracting unit may include: a histogram generating module generating a target histogram for the target region and generating a background histogram for the background region; a lookup table generating module generating a lookup table by using the target histogram and the background histogram; a likelihood map generating module generating a likelihood map by using the lookup table; a threshold calculating module calculating thresholds for extracting the target from the likelihood map; and a threshold-used target extracting module extracting the target from the input image by using the thresholds. The histogram generating module may generate the target histogram by considering a weight value depending on a distance from a center in the target region for each of the pixels constituting the target region.

The background region extracting unit may extract a region where the target region is surrounded by the background region.

The target region extracting unit may extract the target region on the basis of an estimated position of the target from the input image in accordance with a predetermined tracking algorithm.

The target extracted by the target extracting unit may be used to track the target in an image inputted after the input image.

According to the exemplary embodiments of the present invention, it is possible to provide the following effects by achieving the objects. First, it is possible to effectively separate a target region and a background region from each other by adjusting a distance up to a background and the size of the background on the basis of the target region extracted while consecutive images are inputted. Further, it is possible to effectively extract the target from a complicated background and it is possible to obtain statistical characteristics of the target region and the background region by sufficiently ensuring the number of pixels of the background region in accordance with the number of pixels of the target region with reliability.

Second, it is possible to improve reliability in target extracting performance by increasing the number of pixels of the target by using a weight value function. Further, it is possible to alleviate wobbling of a tracking center which is a problem in tracking the weight value center and it is possible to be resistant to noise of an image or external noise such as a target component included in the background region.

BRIEF DESCRIPTION OF THE DRAWINGS

FIG. 2A illustrates a case in which an extracted target is large and FIG. 2B illustrates a case in which the extracted target is small.

FIG. 3 is a diagram illustrating a weight value function (numbers can be arbitrarily changed) for increasing the number of pixels of a target.

FIG. 4 is a flowchart schematically illustrating a method for extracting a target according to an exemplary embodiment of the present invention.

DETAILED DESCRIPTION OF THE EMBODIMENTS

Figure 1:
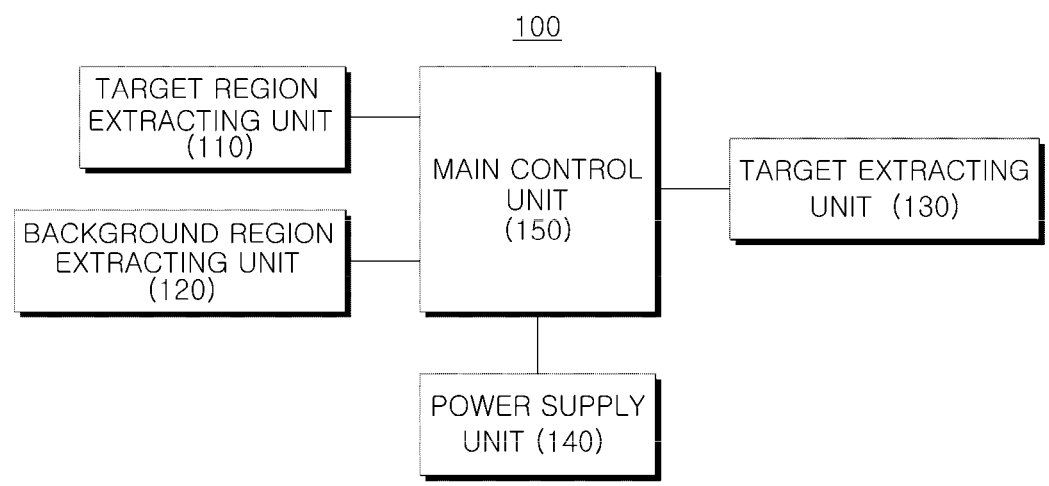
FIG. 1 is a block diagram schematically illustrating an apparatus for extracting a target according to an exemplary embodiment of the present invention.

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. Further, in describing the present invention, well-known functions or constructions will not be described in detail since they may unnecessarily obscure the understanding of the present invention. Hereinafter, the exemplary embodiments of the present invention will be described, but it will be understood to those skilled in the art that the spirit and scope of the present invention are not limited thereto and various modifications and changes can be made.

FIG. 1 is a block diagram schematically illustrating an apparatus for extracting a target according to an exemplary embodiment of the present invention. Referring to FIG. 1, the target extracting apparatus 100 includes a target region extracting unit 110, a background region extracting unit 120, a target extracting unit 130, a power supply unit 140, and a main control unit 150.

In the exemplary embodiment, the target extracting apparatus 100 implements an algorithm separating a target from an image. In detail, the target extracting apparatus 100 implements an algorithm for extracting the target more effectively than the related art in an algorithm separating the target and a background from each other by using statistical characteristics of the target and the background among target extracting methods required in a weight value center tracking method.

The target region extracting unit 110 extracts a target region from an input image. Herein, the image is obtained from a camera (including an infrared camera, a visible ray camera, or the like) and the target includes meaningful information in the obtained image. For example, in the case of a guided missile, targets such as a tank, a helicopter, and the like which the guided missile intends to track are targeted and in the case of a surveillance camera, surveillance objects such as an intruder, and the like are targeted. The reason for separating the target from the image is that the separated target is used as an input of a tracking algorithm. Herein, the tracking algorithm represents an algorithm of tracking the target throughout image frames.

Figure 2:
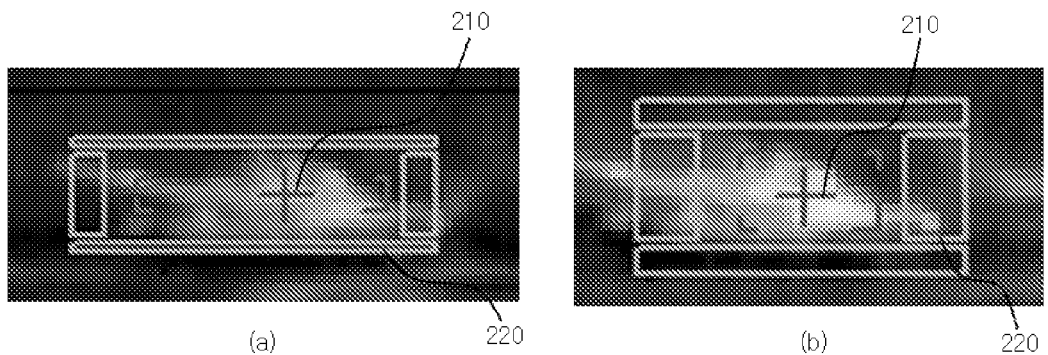
FIG. 2 illustrates an image where a target region and a background image are displayed.

The target region extracting unit 110 extracts the target region on the basis of an estimated position of the target from the input image in accordance with a predetermined tracking algorithm. First, when an image is obtained from a camera, the position of the target is estimated based on the estimated position of the target in accordance with the tracking algorithm. Therefore, it is possible to set the target region such as a red region 210 of FIG. 2.

The background region extracting unit 120 extracts a background region from the input image by considering the size of the target region. The background region extracting unit 120 sets the background region on the basis of the set target region. The set background region is a region such as a green region 220 of FIG. 2, which is distant from the target region by a predetermined distance.

The background region extracting unit 120 extracts the background region by adjusting the size of the background region to be in proportion to the size of the target region. Considering this point of view, the background region extracting unit 120 may be provided with a background region size calculating module and a background region extracting module. The background region size calculating module calculates the size of the background region by multiplying the size of the target region by a predetermined first gain value. The background region extracting module extracts the background region on the basis of the calculated size of the background region.

A result of the target tracking method is largely influenced by the background region setting method. The reason is that the method is based on the assumption that if a part not included in the background region exists in the target region, it is regarded as the target.

In the exemplary embodiment, the background region extracting unit 120 sets the background region for effectively separating the target region and the background region from each other. For this, the background region extracting unit 120 adjusts a distance up to the background and the size of the background on the basis of the extracted target region while consecutive images are inputted.

In the exemplary embodiment, the following equation is used to adjust the size of the background region:

The size of the background region=the size of the target region×$B\_gain$

In the above equation, $B\_gain$ represents a gain value. $B\_gain$ is a proportionality constant for setting the size of the background region on the basis of the size of the target region. $B\_gain$ is experimentally set depending on each situation to appropriately set the size of the background region.

In FIGS. 2A and 2B, when a red box part 210 is a region currently extracted as the target (target region), the background region is upsized in proportion to the size of the target region such as a green box part 220. This is to reliably obtain the statistical characteristics by sufficiently ensuring the number of pixels of the background region in accordance with the number of pixels of the target region.

The background region extracting unit 120 may further consider the distance from the target region at the time of extracting the background region. In this case, the background region extracting unit 120 extracts the background region by adjusting the size of the background region to be in inverse proportion to the distance from the target region. The background region extracting unit 120 may be provided with both the distance calculating module and the background region extracting module. The distance calculating module calculates the distance from the target region by using a value obtained by dividing a predetermined second gain value by the size of the target region. The background region extracting module extracts the background region on the basis of the calculated distance from the target region.

The background region extracting module extracts the background region on the basis of the size of the background region or the distance from the target region. However, in the exemplary embodiment, the module that extracts the background region on the basis of the size of the background region may be defined as a first background region extracting module and the module that extracts the background region on the basis of the distance from the target region may be defined as a second background region extracting module.

A distance between the target region and the background region is obtained by the following equation:

The distance between both regions=$D\_gain$+the size of the target region

In the above equation, both regions represent the target region and the background region and $D\_gain$ represents a gain value. $D\_gain$ is used to set the distance (gap) between the target region and the background region with respect to a horizontal direction and a vertical direction. Like $B\_gain$, this parameter is also experimentally set depending on each situation to appropriately set the gap between the background region and the target region.

The distance between the target region and the background region is in inverse proportion to the size of the target region as shown in FIGS. 2A and 2B. Since most of the targets are extracted in the case in which the target region is large (see FIG. 2A), there is a low probability that components of the target will be included in the background region even in setting the background region to be adjacent to the target region. In contrast, since it may be judged that only some of the targets are extracted in the case where the target region is small (see FIG. 2B), it is possible to disable information on the target to be included in the background region by setting the background region to be far away from the target region.

Meanwhile, the background region extracting unit 120 extracts a region where the target region is surrounded by the background region.

The target extracting unit 130 extracts the target from the input image on the basis of the target region and the background region.

The target extracting unit 130 may be provided with a histogram generating module, a lookup table generating module, a likelihood map generating module, a threshold calculating module, and a threshold-used target extracting module.

The histogram generating module generates a target histogram for the target region and a background histogram for the background region. The histogram generating module obtains the histograms for the defined target region and background region. The histograms are generated by counting the number of pixels of an image within a predetermined region. The histogram generating module generates the target histogram by considering a weight value on the basis of a distance from a center in the target region for each of the pixels constituting the target region.

The lookup table generating module generates a lookup table by using the target histogram and the background histogram. The lookup table generating module generates the lookup table by adding up the histograms of the target region and the background region.

The likelihood map generating module generates a likelihood map by using the lookup table. The likelihood map generating module generates the likelihood map by using the lookup table.

The threshold calculating module calculates thresholds for extracting the target from the likelihood map. The threshold calculating module generates a threshold for extracting the target by using two points of which likelihood maps are equal to or more than the threshold.

The threshold-used target extracting module extracts the target from the input image by using the thresholds.

The target extracting unit 130 uses an increment technique of the number of pixels of the target for improving the reliability in target extracting performance.

In general, there is a high probability that the center of the extracted target will be the target. Accordingly, it is possible to increase the number of pixels of the target by generating a histogram by multiplying the current pixel number by a weight value function of FIG. 3 with respect to the corresponding region. That is, since the histogram is a statistical datum generated by the number of pixels having the same brightness in the corresponding region, one center is changed to thirty three, one neighboring pixel 8 is changed to nine, and one neighboring pixel 4 is changed to five when a mask shown in FIG. 3 is used by granting a weight value to the center (by multiplying a weight value corresponding to a mask with respect to a center region).

The following calculation is performed at the time of generating the histogram in the image:

(1) Read a value of a pixel at a position (X, Y): [A=Image (X, Y)]

(2) Increase a value of a histogram for the read pixel value A: [Hist(A)=Hist(A)+1]

(All Initial Hist Values are Set to 0)

(3) Complete a histogram by repeating processes (1) and (2) while changing the position (X, Y) with respect to the entire image.

Here, when process (2) is modified, that is, the center is covered with the mask, (coefficient 32), Hist(A)=Hist(A)+1+32. Therefore, an effect as if pixels more than one which is the actual number of pixels by thirty two is obtained.

Hist(A)=Hist(A)+1+8 with respect to the top, bottom, left, and right of the center and Hist(A)=Hist(A)+1+4 with respect to a diagonal line of the center. That is, since there is a high probability that the tracking center will be the target, a weight value higher than other pixels is set.

When the method is used, the reliability of target tracking is increased and it is possible to alleviate wobbling of a tracking center which is a problem in tracking the weight value center. Further, it is possible to be resistant to noise of an image or external noise such as a target component included in the background region.

The target extracted by the target extracting unit 130 is used to track a target in an image inputted after the input image.

The power supply unit 140 supplies power to each of the components constituting the target extracting apparatus 100.

The main control unit 150 controls all operations of the components constituting the target extracting apparatus 100.

As described above, the target tracking apparatus 100 can effectively extract the target from the complicated background by proposing a new method for setting the background region which exerts the most influence on tracking the target and in addition, increases the reliability in extracting the target by using the increment technique of the number of pixels of the target, alleviates wobbling of the tracking center, and is resistant to the external noise.

Figure 5:
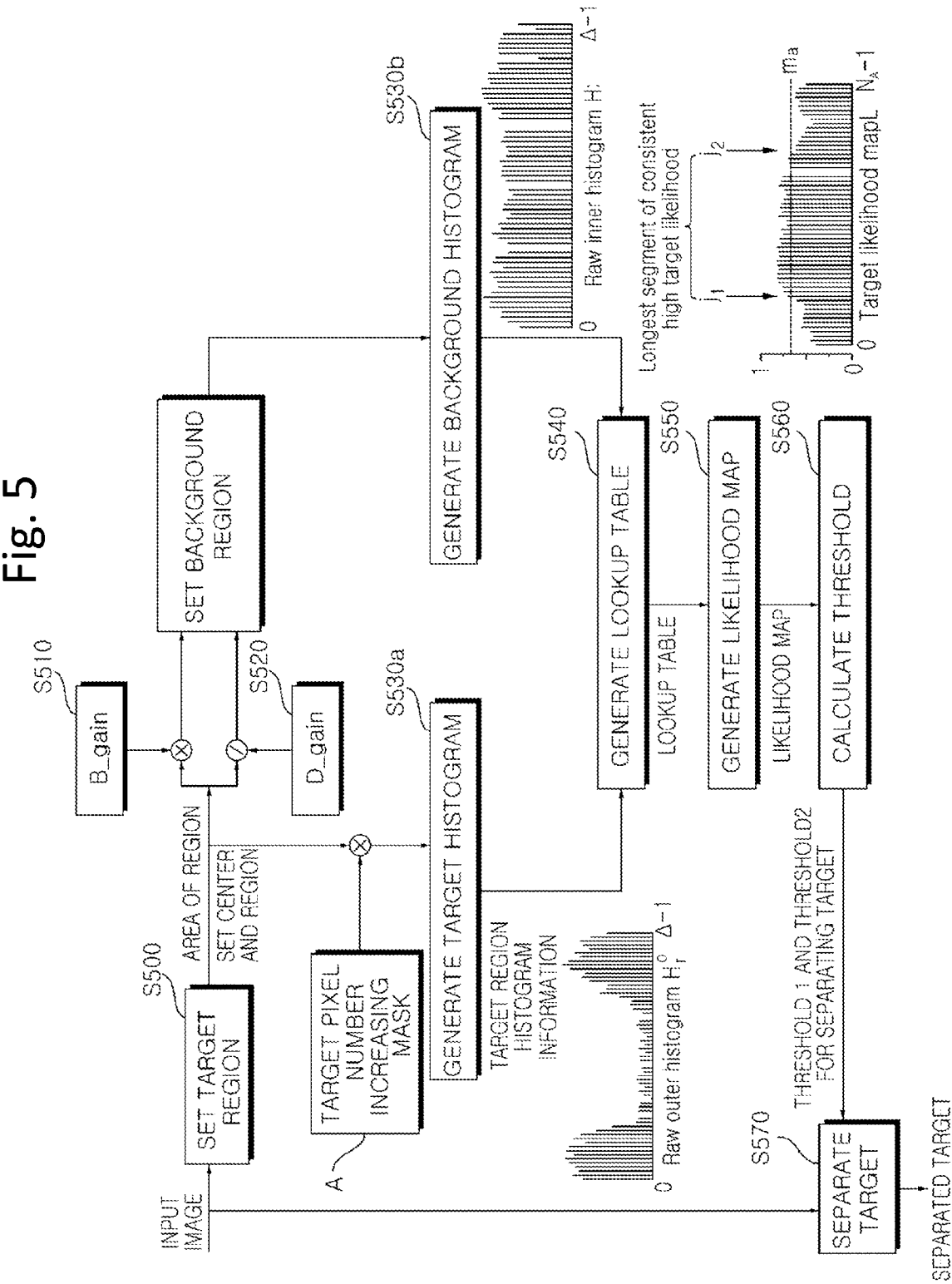
FIG. 5 is a flowchart illustrating in detail a method for extracting a target according to an exemplary embodiment of the present invention.

Next, a method for tracking a target by using the target tracking apparatus 100 will be described. FIG. 4 is a flowchart schematically illustrating a method for extracting a target according to an exemplary embodiment of the present invention. In addition, FIG. 5 is a flowchart illustrating in detail a method for extracting a target according to an exemplary embodiment of the present invention. Hereinafter, a description will be made with reference to FIGS. 4 and 5.

First, a target region extracting unit 110 extracts a target region from an input image (S400). Thereafter, a background region extracting unit 120 extracts a background region from the input image by considering the size of the target region (S410). Then, a target extracting unit 130 extracts the target from the input image on the basis of the target region and the background region (S420).

The target region extracting unit 130 extracts the target region on the basis of an estimated position of the target from the input image in accordance with a predetermined tracking algorithm (S500).

The background region extracting unit 120 extracts the background region by adjusting the size of the background region to be in proportion to the size of the target region. In detail, the background region extracting unit 120 calculates the size of the background region by multiplying the size of the target region by a predetermined first gain value and extracts the background region on the basis of the calculated size of the background region (S510).

The background region extracting unit 120 further considers a distance from the target region at the time of extracting the background region. In detail, the background region extracting unit 120 extracts the background region by adjusting the size of the background region to be in inverse proportion to the distance from the target region. In more detail, the background region extracting unit 120 calculates the distance from the target region by using a value obtained by dividing a predetermined second gain value by the size of the target region and extracts the background region on the basis of the calculated distance from the target region (S520).

The background region extracting unit 120 extracts a region where the target region is surrounded by the background region.

The target extracting unit extracts the target from the input image by performing the following processes. First, a histogram generating unit generates a target histogram for the target region (S530a) and generates a background histogram for the background region (S530b). Preferably, the histogram generating unit generates the target histogram by considering a weight value on the basis of on a distance from a center in the target region for each of the pixels constituting the target region (A). Thereafter, a lookup table generating module generates a lookup table by using the target histogram and the background histogram (S540). Then, a likelihood map generating module generates a likelihood map by using the lookup table (S550). Thereafter, a threshold calculating module calculates thresholds for extracting the target from the likelihood map (S560). Then, a threshold-used target extracting module extracts the target from the input image by using the thresholds (S570). The extracted target is used to track the target in an image inputted after the input image.

Meanwhile, the foregoing embodiments of the present invention can be prepared by programs running in a computer and can be implemented by a general-purpose digital computer that runs the programs using a recording medium readable with the computer. The recording medium readable with the computer includes magnetic storage media (for example, ROM, floppy disk, hard disk, etc.), optical reading media (for example, CD-ROM, DVD, etc.), and storage media such as carrier wave (for example, transmission through Internet).

The spirit of the present invention has been just exemplified. It will be appreciated by those skilled in the art that various modifications, changes, and substitutions can be made without departing from the essential characteristics of the present invention. Accordingly, the exemplary embodiments disclosed in the present invention and the accompanying drawings are used not to limit but to describe the spirit of the present invention. The scope of the present invention is not limited only to the exemplary embodiments and the accompanying drawings. The protection scope of the present invention must be analyzed by the appended claims and it should be analyzed that all spirits within a scope equivalent thereto are included in the appended claims of the present invention.

The present invention can be applied to a tracking algorithm for tracking a target (a tank, a helicopter, or the like) which a guided missile intends to track as a target.

What is claimed is:

1. A method for extracting a target, comprising:
    extracting a target region from an input image;
    extracting a background region from the input image by considering the size of the target region and a distance from the target region, wherein in extracting the background region, the background region is extracted by adjusting the size of the background region to be in inverse proportion to the distance from the target region; and
    extracting the target from the input image on the basis of the target region and the background region.

2. The method of claim 1, wherein in the extracting of the background region, the background region is extracted by adjusting the size of the background region to be in proportion to the size of the target region.

3. The method of claim 2, wherein in the extracting of the background region, the size of the background region is calculated by multiplying the size of the target region by a predetermined first gain value and the background region is extracted on the basis of the calculated size of the background region.

4. The method of claim 1, wherein in the extracting of the background region, the distance from the target region is calculated by using a value obtained by dividing a predetermined second gain value by the size of the target region and the background region is extracted on the basis of the calculated distance from the target region.

5. The method of claim 1, wherein the extracting of the target includes:
   generating a target histogram for the target region and generating a background histogram for the background region;
   generating a lookup table by using the target histogram and the background histogram;
   generating a likelihood map by using the lookup table;
   calculating thresholds for extracting the target from the likelihood map; and
   extracting the target from the input image by using the thresholds.

6. The method of claim 5, wherein in the generating of the histogram, the target histogram is generated by considering a weight value on the basis of a distance from a center in the target region for each of the pixels constituting the target region.

7. The method of claim 1, wherein in the extracting of the background region, a region where the target region is surrounded by the background region is extracted.

8. The method of claim 1, wherein in the extracting of the target region, the target region is extracted on the basis of an estimated position of the target from the input image in accordance with a predetermined tracking algorithm.

9. The method of claim 1, wherein the target extracted in the extracting of the target is used to track the target in an image inputted after the input image.

10. A non-transitory computer readable recording medium storing a program performing a method of claim 1.

11. An apparatus for extracting a target, comprising:
   a target region extracting unit extracting a target region from an input image;
   a background region extracting unit extracting a background region from the input image by considering the size of the target region and a distance from the target region, wherein in extracting the background region, the background region is extracted by adjusting the size of the background region to be in inverse proportion to the distance from the target region; and
   a target extracting unit extracting the target from the input image on the basis of the target region and the background region.

12. The apparatus of claim 11, wherein the background region extracting unit includes:
   a background region size calculating module calculating the size of the background region by multiplying the size of the target region by a predetermined first gain value;
   a distance calculating module calculating the distance from the target region by using a value obtained by dividing a predetermined second gain value by the size of the target region; and
   a background region extracting module extracting the background region on the basis of the calculated size of the background region and the calculated distance from the target region.

13. The apparatus of claim 11, wherein the target extracting unit includes:
   a histogram generating module generating a target histogram for the target region and generating a background histogram for the background region by considering a weight value on the basis of a distance from a center in the target region for each of the pixels constituting the target region;
   a lookup table generating module generating a lookup table by using the target histogram and the background histogram;
   a likelihood map generating module generating a likelihood map by using the lookup table;
   a threshold calculating module calculating thresholds for extracting the target from the likelihood map; and
   a threshold-used target extracting module extracting the target from the input image by using the thresholds.

* * * * *